United States Patent

Maier

[11] Patent Number: 5,859,402
[45] Date of Patent: Jan. 12, 1999

[54] PROCESS FOR THE WELDING OF WORK PIECES WITH LASER BEAMS

[75] Inventor: Christof Maier, Aachen, Germany

[73] Assignee: Fraunhofer-Gesellschaft Zur Forderung Der Angewandten Forschung E.V., Munich, Germany

[21] Appl. No.: 860,896

[22] PCT Filed: Nov. 23, 1995

[86] PCT No.: PCT/DE95/01635

§ 371 Date: Jun. 23, 1997

§ 102(e) Date: Jun. 23, 1997

[87] PCT Pub. No.: WO96/20063

PCT Pub. Date: Jul. 4, 1996

[30] Foreign Application Priority Data

Dec. 24, 1994 [DE] Germany .......................... 44 46 560.2

[51] Int. Cl.⁶ .............................. B23K 26/00; B23K 9/00
[52] U.S. Cl. ................................ 219/121.64; 219/121.69; 219/137 R
[58] Field of Search .................... 219/121.63, 121.64, 219/121.76, 137 R, 122, 124.1, 121.68, 121.69

[56] References Cited

U.S. PATENT DOCUMENTS

| | | |
|---|---|---|
| 3,278,720 | 10/1966 | Dixon ........................................ 219/118 |
| 4,167,662 | 9/1979 | Steen . |
| 4,507,540 | 3/1985 | Hamasaki . |
| 5,510,597 | 4/1996 | Kampmann et al. ............... 219/137 R |

FOREIGN PATENT DOCUMENTS

| | | |
|---|---|---|
| 4117263 | 7/1992 | Germany . |
| 58-154460 | 9/1983 | Japan . |
| 60-121093 | 6/1985 | Japan ................................ 219/121.64 |
| 62-179872 | 8/1987 | Japan . |
| 62-263869 | 11/1987 | Japan ................................ 219/121.64 |
| 64-62291 | 3/1989 | Japan ................................ 219/121.64 |
| 6-198472 | 7/1994 | Japan ................................ 219/121.64 |
| 1547172 | 6/1979 | United Kingdom . |
| 92/11971 | 7/1992 | WIPO ................................ 219/121.64 |

*Primary Examiner*—Gregory L. Mills
*Attorney, Agent, or Firm*—Pandiscio & Pandiscio

[57] ABSTRACT

A process for welding work pieces (10) with a laser beam that is focused upon the work pieces (10) that are moved relative to it, and causes vaporization of the material, such that apart from the laser beam (11), an arc (12) is used in the area of the work pieces (10) that is struck by the laser beam. In order to improve the welding result, the process is undertaken in such a way that a work piece (10) with a laser-formed surface pathway that is free of dielectric substances, which pathway guides the arc (12) within a dielectric layer (15) that completely covers the remainder of the area of the weld (14), is used.

7 Claims, 4 Drawing Sheets

PROCESS FOR THE WELDING OF WORK PIECES WITH LASER BEAMS

The invention relates to a process for welding work pieces with a laser beam that is focused on the work piece, which is moved relative to the beam causing a vaporization of the material, such that apart from the laser beam, an arc is used in the area of the work pieces that are struck by the laser beam.

Processes having the aforementioned process steps are generally known as laser beam hybrid welding, and they are used, for example, to weld sheet metal. At the welding point, which is determined by the laser beam, not only is energy used with the aid of laser beams, but also with the aid of the arc. In the process, automatic guidance of the arc by its electrode to the area of the weld, which is determined by the laser beam, occurs. This guidance, or even a contraction of the arc, can be explained by several phenomena. If the laser beam merely heats the surface of the work piece, without any vaporization of the metal occurring, thermally-generated electrons give rise to a local increase of electrical conductivity, which gives rise to thermally-produced electrons. A corresponding electrical field results, which contributes to the guidance of the arc. If, as a result of the laser irradiation, metal is vaporized, the composition of the plasma changes, and, as a result of the comparably low ionization energy of the metallic vapor, a pathway of elevated conductivity is formed for the arc. In addition, an interactive effect occurs between the laser beam and the plasma that is formed as a result of ionization. In keeping with the physical parameters and the geometry of the work piece, the guidance of this arc is pronounced, to a greater or lesser degree. For technical applications, stable arcs of high output density are called for.

Accordingly, it is the underlying task of the invention to improve a process having the processing steps enumerated at the outset in such a way that the guidance of the arc, in the sense of stable arcs of high output density is improved.

This task is fulfilled by virtue of the fact that a work piece having a dielectrically free surface which guides the arc is used in a dielectric layer that completely covers the remainder of the area of the weld.

In the process described above, the conductivity on the surface of the work piece is reduced by the application of the dielectric layer. The dielectric layer works as an insulator. The arc will not be based, without further ado, in a superficial area of the work piece with a dielectric layer. It will tend, rather, to have its point of impact on the surface of the work piece in the processing area of the work piece that is determined by the laser beam.

It is particularly advantageous to operate the process in such a way that the work piece consists of an aluminum alloy, and the oxide layer of the work piece is used as the dielectric layer. The aluminum, or aluminum alloy, respectively, forms an oxide layer relatively quickly after the work piece is shaped, which oxide layer exhibits dielectric behavior and may be used as a dielectric layer in the spirit of the invention. By contrast, it is known from WELDING JOURNAL, June 1984, page 18 ff that the surface of the specimens or work pieces are to be brushed and cleaned prior to welding in order to remove oxides and residues. Within the context of the present invention, therefore, it is significant to have recognized that contrary to the practices that have been employed thus far in welding, it is possible to use the oxide layer that is present in the sense of a guide for the arc in the welding pathway.

It is not necessary to allow dielectric layers to develop naturally on work pieces. It is also possible, rather, to perform the process in such a way that the dielectric layer is applied prior to welding as needed to the work piece in the area of the weld, except for the pathway that guides the arc. The application can occur, without any further ado, by artificial means, thus, with the structure that is required of the pathway on the surface. The dielectric layer can, for example, be applied in the screen printing process in such a way that the requisite dielectrically-free, or rather, shiny, surface pathway is not also printed upon.

However, it is also possible to proceed in such a way that the pathway of the dielectric layer that guides the arc is freed of the dielectric substance prior to welding, by thermal, mechanical, or chemical means. The number of thermal, mechanical, or chemical means that lend themselves well to this purpose, is great. For example, a special laser beam that is adjusted to the width of the pathway can be used, which precedes the processing point. By changing the point of its beam, and the resultant changing width of the pathway, the thermal engagement can be concentrated at the surface of the work piece or expanded, depending upon the requirements imposed by the structure of the work piece. Brushes guided along the course of the pathway may be considered, accordingly, as mechanical means. Adjuvants that reduce the oxide may be used as chemical means, in that they are applied, for example, to the sheet metal, or added to the protective gas. The energy of activation can be made available by the arc itself, so that given a narrow track of reduction agents, a corresponding guidance and contraction of the arc can occur.

As a rule, however, the process is conducted in such a way that the dielectric layer of the work piece is removed with the laser beams in the area of the pathway that guides the arc.

Advantageous welding results can be achieved if the process is conducted in such a way that during the movement with the laser beam relative to the work piece, in the pathway that guides the arc, a vapor channel is formed within the work piece. With the aid of the dielectric layer, the safety of guiding the arc's flow of current can be improved, and the latter arc can be contracted in such a way that the arc's density of energy, when compared with customary methods of hybrid welding, can be enhanced toward the work piece. As a result of the enhancement of the arc's energy density, it is possible to achieve an enhancement of the speed of welding. If this method is applied to a work piece made of aluminum, a considerable improvement in the quality of the welded seam results. In particular, holes that frequently occur as a result of molten discharges are effectively circumvented.

If short wave laser beams are used for welding, especially those of a low-pressure-YAG laser, considerable improvement of safety results with respect to guiding the flow of current to the laser-induced vapor capillary.

In order to achieve structural simplification of the tool, the process in undertaken in such a way that an arc electrode that follows in close proximity to the laser beam that removes the dielectric layer is used. The synergistic effects due to the focused laser beam and the concentrated arc are then particularly strong. In this sense, the process is conducted in such a way that the electrode for the arc is used with an oblique jet of protective gas that is close to the laser beam.

It is advantageous to undertake the process in such a way that the arc is operated with direct current or alternating current having a great preponderant proportion of direct current. If the poles on the work piece or the electrode are arranged accordingly, the possibility of avoiding the negative effects of alternating current methods results accordingly, such as, for example, a shortening of the electrode's serviceable life. The electrode can also be operated with an alternating current in which the direct current component predominates. Even then, the negative effects that occur in conjunction with the known alternating current methods can be avoided, because the positive poling of the electrode need not be used in order to break up the oxide layer such as that which is present, for example, in the case of work pieces made of aluminum.

The invention is elucidated by virtue of the embodiment examples shown in the drawing.

FIGS. 5a through 5d show sectional views through a piece of sheet metal consisting of stainless steel, after a welded seam has been applied, and FIGS. 6a through 6d show the views that correspond to FIGS. 5a through 5d, for a piece of sheet metal consisting of aluminum.

Figure 1:
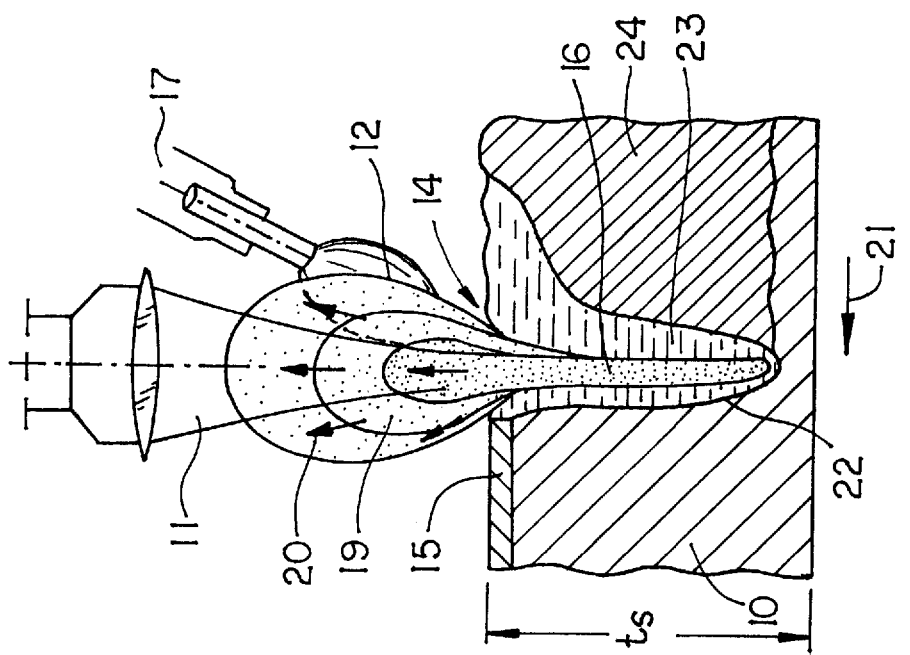
FIG. 1 shows a cross-section view of a processing point of a work piece with an electrode following after the laser beam as it is advanced relative to the piece.

FIG. 1 shows, in schematic sectional view, an apparatus for processing work pieces, 10, with a laser beam 11, which is focused upon work piece 10. Work piece 10 is represented schematically and is, for example, a piece of sheet metal, 3 mm thick. The depth of weld, $t_s$, extends through practically the entire thickness of the work piece, because, with the help of the laser beam, 11, a vapor channel, 16, is formed. The material that is present in this area of the work piece, 10, is vaporized, in the course of which a plasma, 19, is formed, and it escapes upward, out of vapor channel 16, according to the arrows, 20. A relative advance occurs between the work piece, 10, and the laser beam, 11, in the direction of the arrow, 21, such that the front, 22, of molten zone 23 is moved toward the left. Between melting front 22 and vapor channel 16, the area of the fluid melt is relatively narrow. The fluid melt of this area is either vaporized or it escapes around the vapor channel 16, behind the latter. The fluid melt that is located behind this vapor channel 16, cools and rigidifies to the solid melt, 24. The area of the fluid melt, 23, behind the vapor channel 16, corresponds in width to the rigidification behavior.

Figure 2:
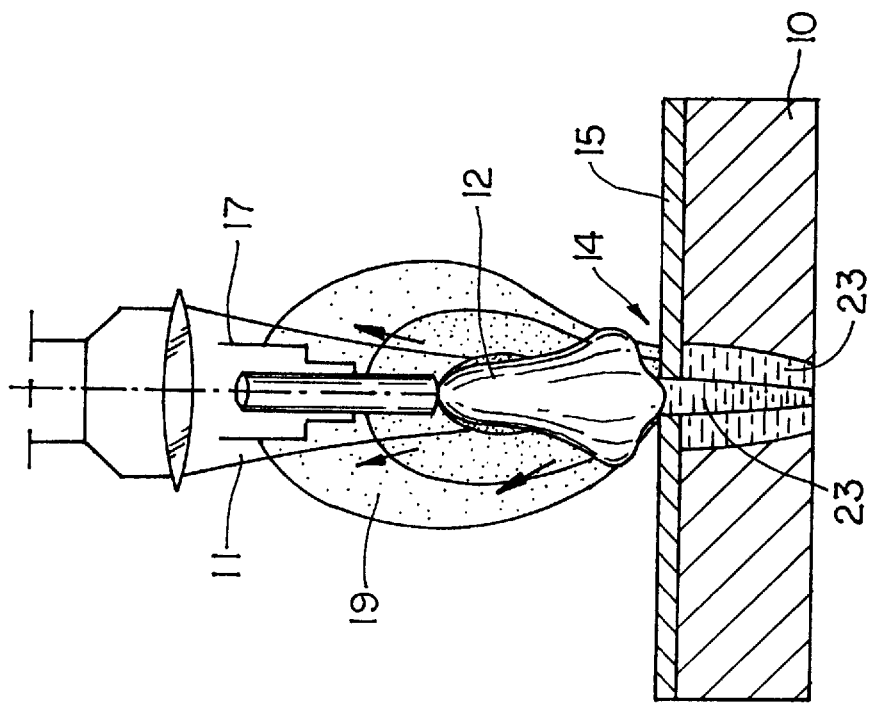
FIG. 2 shows a view of the apparatus of FIG. 1, turned around 90° in the direction of the relative advance.

FIG. 1 shows that an arc electrode, 17, is used to generate an arc, 12, which is ignited in the welding area 14 of work piece 10. The work piece 10 functions as the opposite electrode, and both electrodes are subjected to a suitable voltage for electrodes. An arc, 11, namely ionized gas, develops between them. This gas, or plasma of the arc, 12, transports energy to the vapor channel 16, due to the fact that the arc, 12, is based, in welding area 14, upon the surface of work piece, 10, or rather, in vapor channel 23. At any rate, FIG. 2 shows a form of the arc 12, which exhibits an ensnaring.

The concentration of arc 12 on the surface of the work piece, which is determined by the laser beam 11, is achieved, on the one hand, by virtue of the fact that metal that has been vaporized by the laser beam 11 defines the path of least resistance for the arc 12. The column of metallic vapor in question, through the influence of the arc itself, becomes a highly conductive channel by means of which the efficiency of the arc is enhanced, and a guidance of the arc results.

Consequently, using the arc, energy can be introduced to the vapor channel that is generated by the laser beam and the absorption of the laser beam on the pre-heated metal increases. In the process, the arc presses a depression into the melt, so that the laser beam strikes below the level of the work piece onto the melt, and thus, it can penetrate more deeply overall into the work piece.

The special ensnaring of the arc above the level of the surface of the work piece is achieved by means of a dielectric layer, 15. This dielectric layer, 15, works as an insulator and it prevents the arc, 12, from taking hold at that point where it is present. If the dielectric layer, 15, is removed, namely by the laser beam 11, for example, the result is the exposed metal of the work piece, which results in an excessive increase of the electrical field. On the one hand, this facilitates the ignition of the arc and on the other hand, it fixes the striking point of the arc horizontally oblique and halfway parallel to the relative direction of advance.

Figure 3:
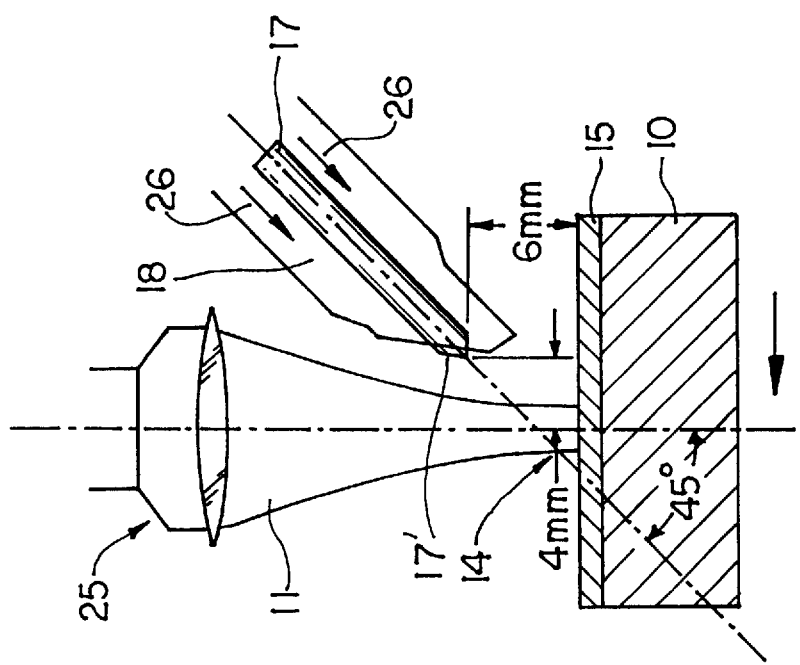
FIG. 3 shows a view similar to that of FIG. 1, of the structure of the tool that processes the work piece.

By virtue of FIG. 3, it can be explained that the structure of the welding tool above work piece 10, is very compressed. The optical system, 25, for focusing the laser beam, 11, is arranged so as to be in close proximity to the electrode for the arc, 17, such that the distance of the point of the electrode, 17' from the vertical axis of the laser beam 11 is only about 1 to 10 mm, while the distance to the oxide layer 15, is, likewise, just about 1 to 10 mm. The orientation of the electrode, 17, is set beneath 45° for example, such that the point of impact of its axis advances ahead of the point of the beam of laser beam 11. The electrode is surrounded by a mantle provided by a protective gas jet, 18, by means of which the protective gas, 26, is blown onto the processing point, 14.

Figure 4:
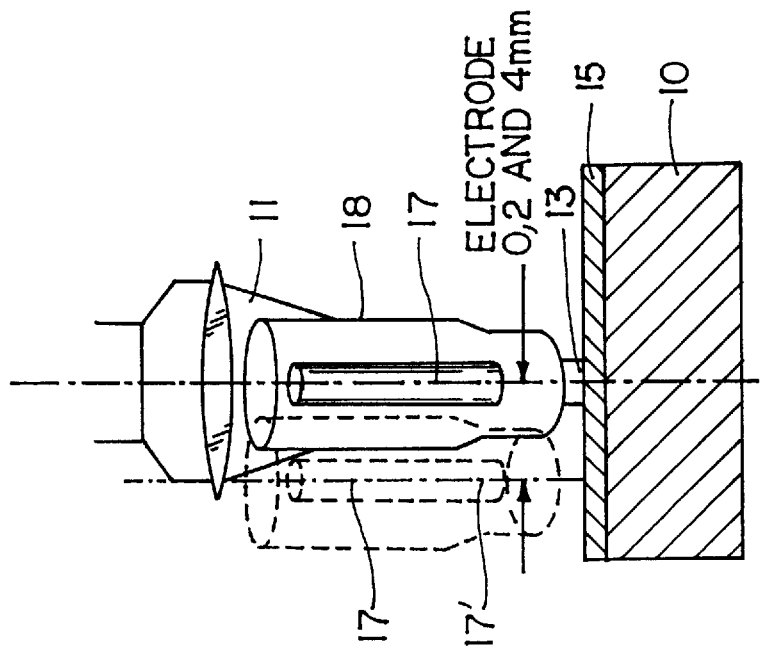
FIG. 4 shows a view similar to the representation in FIG. 2, in the relative direction of advance.

The point of the beam that strikes the work piece, 10 from laser beam 11 is determined by the dielectrically free surface pathway, 13, insofar as its width is concerned. This pathway, 13, guides the arc, 12, and anchors it in the welding area, 14, which is determined by the point of the beam. By virtue of FIG. 4, it is possible to see that the electrode, 18, can be provided with a means of shifting electrode positioning. Due to the fact that a flow of current is rendered more difficult by way of the dielectric layer, 15, and the electrical field is diminished, the guidance of the arc across the ionization column, which follows a somewhat skewed path in keeping with the position-changing apparatus, remains stable, and the arc is guided on pathway 13 and is drawn together toward that point. As a consequence, by removing the dielectric layer, 15, by means of the laser beam 11, it is possible to achieve guidance of the arc, 12. The guidance is so good that one is free, in large measure, to position the electrode, 17. It can be positioned in front of, behind, or beside the laser beam, and it need only be brought into that area of the metallic surface close to the work piece that is produced by the metallic surface that has been freed of the dielectric layer 15 and of the metallic vapor column that was produced by the laser beam 11. In the process, all that is required is to assure that the laser beam, 11, is not shaded by the electrode, 17.

Figure 5B:
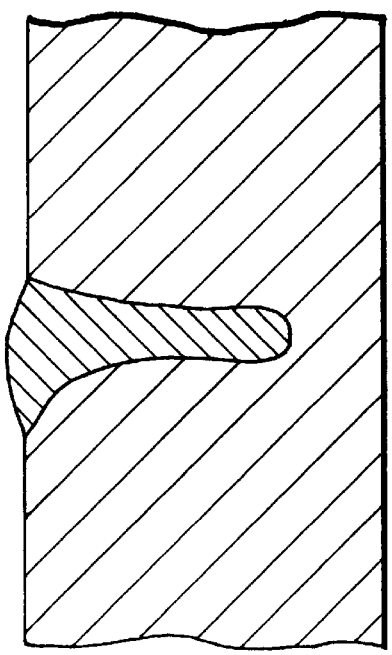
Figure 5D:
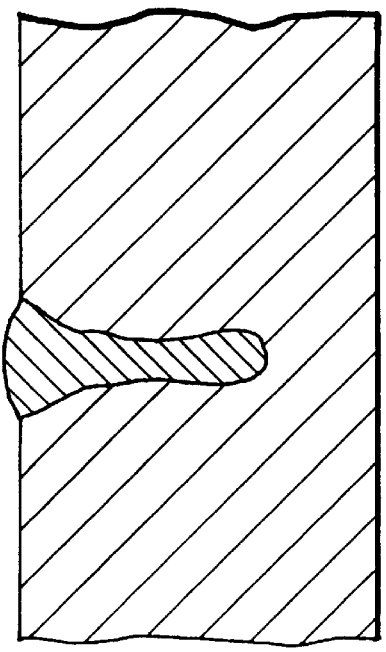
Figure 5A:
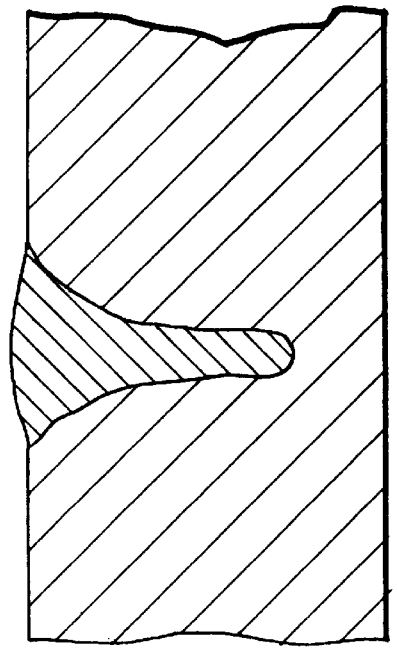
Figure 5C:
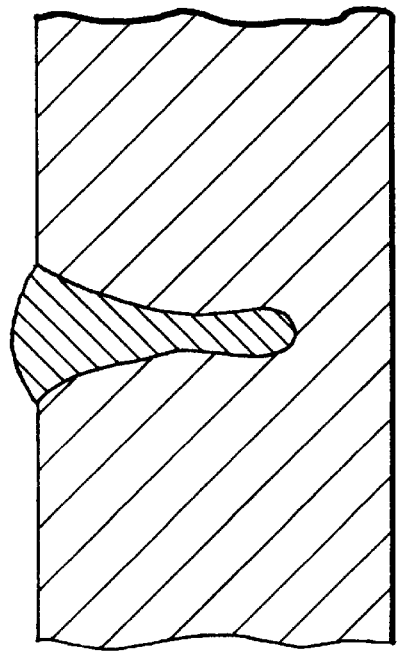

In FIGS. 5a through 5d, schematically-represented transverse grindings of welds in sheets of stainless steel measuring 3 mm in thickness are shown. A 2kW-cw-low-pressure YAG laser was used as the source of the laser beam. All figures show a deep welding effect of the laser beam as a result of the embodiment of a vapor channel in the course of the process. FIG. 5d shows a welded seam that was produced only by means of a laser beam. FIGS. 5a through 5c, by contrast, were produced by using an arc in addition. The current of the arc was set at 200 A. FIGS. 5a through 5c are distinguished by virtue of the shifting of the electrode, 17, laterally, to the direction of advance according to FIG. 4. The shift in FIG. 5a is 0 mm, 2 mm in FIG. 5b, and 4 mm in FIG. 5c. When compared with FIG. 5d, in all representations of FIGS. 5a through 5c, a protuberant area may be seen near the surface, which was formed as a result of the heating of the surface of the work piece by the arc. The protuberant area becomes increasingly smaller the greater the lateral offset of the electrode is. The molten surface of the cross-section decreases as the lateral offset of the electrode increases. That has its reason in the fact that in the case of stainless steel, practically no oxide layer is present. The laser beam, 11, produces, in its pathway, no surface pathway that is decidedly freer of a dielectric agent, when compared with the adjacent welding area. No enhancement of an electrical field results, and accordingly, the arc is not guided or contracted. Rather, it is based, substantially, in an area that is vertically closely adjacent to the point of the electrode, 17,' unimpeded by an oxide layer or a dielectric layer, 15. In the weld according to FIG. 5c, the base point of the arc was distinguished by its clear shift of position, as well as by the seam that was produced by the laser. In cross-section, however, this is not visible, due to the fact that in this case, the energy input from the arc does not give rise to any melting.

Figure 6A:
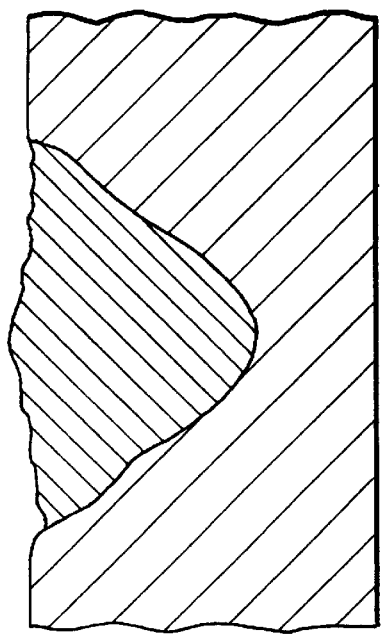
Figure 6B:
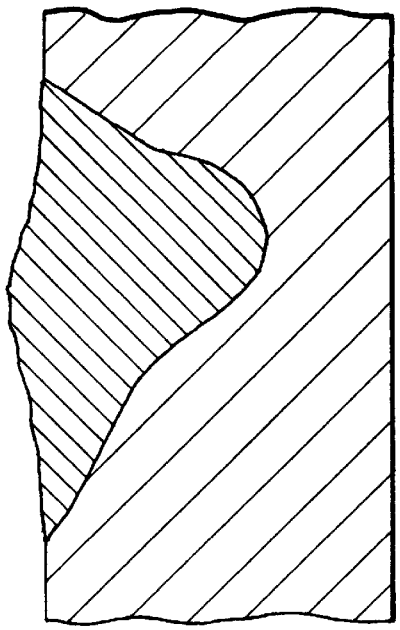
Figure 6C:
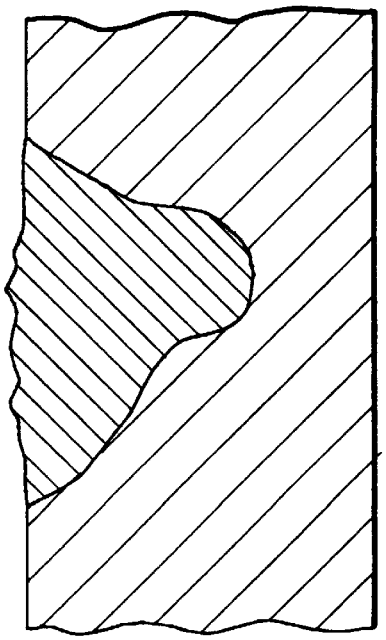
Figure 6D:
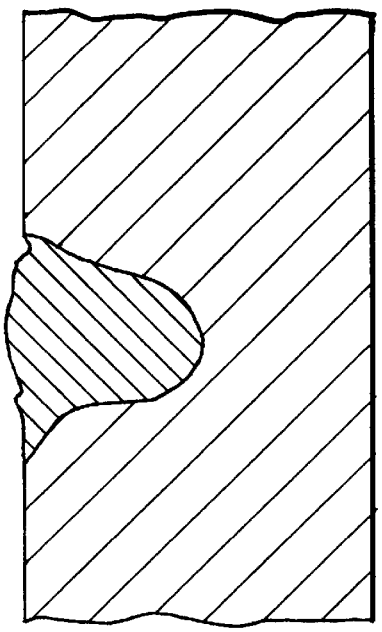

FIGS. 6a through 6d show schematically-represented transverse grindings of welds in untreated AlMg$_3$ sheets measuring 3 mm in thickness. The remaining parameters are the same as in the case of the welds according to the FIGS. 5a through 5d. FIG. 6d represents a pure laser weld. In the case of FIGS. 6a through 6c, when compared with FIG. 6d, there is a definite enlargement of the molten AlMg$_3$ volume. In FIGS. 6a through 6b, this volume corresponds, approximately, to two-fold, and, in the case of FIG. 6c, approximately 1.7-fold the melt volume of the pure laser seam according to FIG. 6d. This slightly reduced melt volume in conjunction with 4 mm shift in electrode position, is caused by irregular, short-term arc-overs of the arc onto the sheet metal directly beneath the electrode. In all the FIGS. 6a through 6c, it is possible to see that the protuberant area and the slim area which penetrates deeply, overlap one another as a result of the formation of a vapor channel. Indeed, the protuberant area tends to be shifted in the direction of the electrode, whose position has shifted, which means that the arc exerts an influence, even outside the area of the seam, which is determined by the laser beam. In face of the considerable molten volume, the shift is, nevertheless, relatively slight, because the arc is deflected by the axis of the electrode, laterally, toward the laser weld seam if the electrode is arranged such that is position is offset.

From these welding results, it is possible to conclude that the process according to the invention lends itself well to all types of metal work pieces whose surface exhibits a dielectric layer. This layer may be present as the result of natural accumulation, as is the case with aluminum, in particular, due to oxidation, or it can be made to accumulate with the aid of oxidants, or it may be applied artificially.

When conducting the welds of FIGS. 5a through 5d and 6a through 6d, direct current was used, in which the polarity of electrode 17 was negative. Consequently, an efficient coupling of energy in the work piece was achieved. Positive polarity of the electrode could be avoided because the dielectric layer, 15, did not need to be broken up, but rather, removed by the laser beam, 11. In the area of the surface pathway that has been freed of the dielectric substance, an enhancement of the electric field to sparking and subsequent guidance and contraction of arc 12 resulted.

I claim:

1. A process for welding work pieces (10) using a laser beam that is focused upon a surface of a work piece (10) that is moved relative to the laser beam, the laser beam causing vaporization of work piece material at a continuous series of selected points on said surface, and wherein an arc (12) is struck upon said work piece surface adjacent said selected points of the work piece (10) that are serially struck by the laser beam, characterized by the fact that the work piece (10) is provided with a dialectrically-free superficial pathway (13) formed by said continuous series of points acted upon by said laser beam and adjacent to the arc (12), said pathway guiding the arc (12) in a dielectric layer (15) that covers a remaining welding area (14), and wherein the laser beam (11) is focused to remove dielectric material from said work piece to form said pathway with said continuous series of selected points.

2. A process according to claim 1, characterized by the fact that the work piece (10) consists of an aluminum alloy, and that an oxide layer of the work piece (10) is used as the dielectric layer (15).

3. A process according to claim 1, characterized by the fact that the dielectric layer (15) in the area of the weld (14) is applied to the work piece (10) prior to welding.

4. A process according to claim 1, characterized by the fact that by means of the laser beam (11) during its motion relative to the work piece (10), a vapor channel (16) is formed in the work piece (10) on the pathway (13) that guides the arc (12).

5. A process according to claim 1, characterized by the fact that a laser beam (11) having a short wavelength is used for welding, especially a YAG laser.

6. A process according to claim 1, characterized by the fact that an arc electrode (17) is used to provide said arc (12) with a jet of protective gas (18) in close proximity to the laser beam.

7. A process according to claim 1, characterized by the fact that the arc (12) is operated using a selected one of (i) direct current and (ii) alternating current in combination with direct current with a proportion of direct current substantially exceeding a proportion of alternating current.

* * * * *